Aug. 9, 1938.  J. MIHALYI  2,126,338

EXPOSURE CONTROL FOR PHOTOGRAPHIC APPARATUS

Filed March 23, 1936

INVENTOR.
Joseph Mihalyi
BY Newton M. Perrins.
Rolla N. Carter
ATTORNEYS

Patented Aug. 9, 1938

2,126,338

UNITED STATES PATENT OFFICE 2,126,338

EXPOSURE CONTROL FOR PHOTOGRAPHIC APPARATUS

Joseph Mihalyi, Rochester, N. Y., assignor, by mesne assignments, to Eastman Kodak Company, Jersey City, N. J., a corporation of New Jersey Application March 23, 1936, Serial No. 70,320

2 Claims. (Cl. 88—16)

This invention relates to exposure controls for photographic cameras, and is particularly directed toward providing means whereby the photographic light value of an object or scene toward which a camera is directed activates a light sensitive device which translates this light value into a visual indication or reading, in combination with means for manually adjusting the camera exposure setting to a value determined by said indication, to accomplish correct exposure of the particular film or plate in the camera.

It has become quite common to employ objectives of different focal lengths interchangeably on a single camera. This practice makes it desirable to alter or adjust the light measuring device so as to take into account the different exposures needed when different focal length objectives are used even though the same lighting conditions exist. When this adjustment is left to the operator it is frequently overlooked by him when he changes his objective with a consequent wastage of time and material or at least a result which is far from satisfactory.

This disadvantage is eliminated by my present invention by relieving the operator of the responsibility of making any adjustment upon changing from one focal length objective to another. This is accomplished by providing the objectives with means for assuring the correct adjustment when the objective is positioned on the camera.

This invention is applicable to cameras for either still or motion pictures, but for simplicity the drawing forming a part of this specification illustrates a preferred form of the invention as applied to a motion picture camera of a standardized type.

Referring to the drawing.

Figure 1:
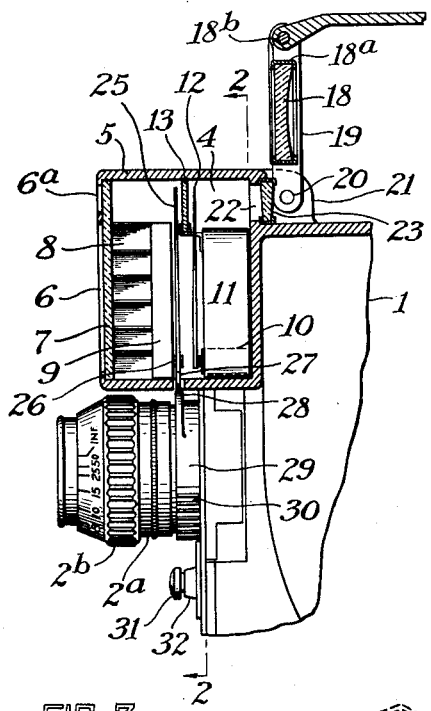
Fig. 1 is a fragmentary side elevation of a motion picture camera with the cover removed, and with the parts embodying this invention shown partly in section.
Figure 2:
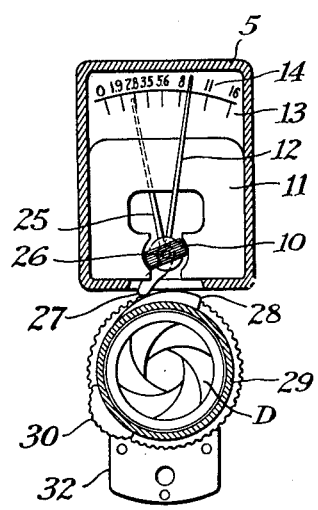
Fig. 2 is a section substantially on line 2—2 of Fig. 1.
Figure 3:
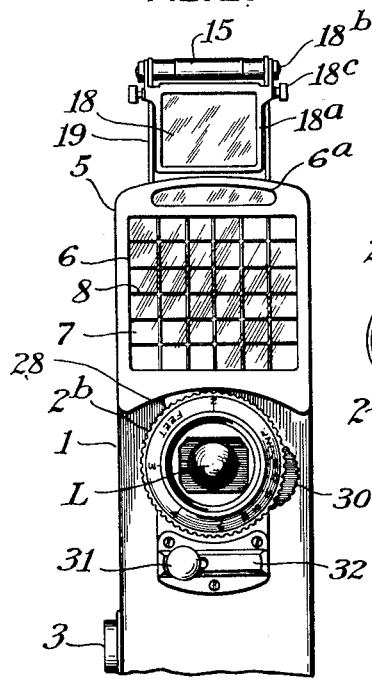
Fig. 3 is a front elevation.

It is one object of this invention to enable the operator of a camera to direct the latter at the view or subject to be photographed, and while the view is visible in the finder, and the camera is in position for action, to adjust the exposure setting to the required value without having to remove his attention from the finder. This object is most conveniently attained by rendering the scale which gives the light-value reading visible to the operator simultaneously with the view, and by providing a manual control, conveniently located, whereby the operator may adjust the exposure settings in accordance with said reading. The manual control preferably includes a separate indicator, also visible to the operator simultaneously with the view, which, when moved to a predetermined relation to the light-value scale reading, will inform the operator that the exposure device has been set to the required value. This latter condition is attained without diverting the attention of the operator from the finder.

In the particular embodiment illustrated herein, a motion-picture camera I having the usual lens mount 2ª with focusing bezel 2ᵇ and lens L projecting from its front is provided with a suitable operating release 3 and a cover lock Iª. A compartment 4 within a shell or housing 5 which may be a part of the camera body is preferably located above the lens mount 2ª and has a front opening 6 with a cover glass 7, directly back of which is a cellular baffle 8 which limits the cone angle of the light incident on a light sensitive cell 9 positioned immediately behind the baffle 8. This cell 9 which preferably is of the dry photo voltaic type is connected in a suitable well-known manner, (not shown) with an armature coil 10 rotatably mounted in the field of a magnet 11, so that when the cell 9 is activated by light from the view toward which the camera is directed, the current set up in the armature 10 will cause an indicating member or pointer 12, mounted on its shaft to move over a suitable plate 13 of transparent or translucent material, which may be calibrated with a scale or a series of figures 14 representing "f" values of the lens diaphragm or shutter speed settings according to the usual standards. The action of light of greater intensity, in the present instance, causes the indicator or pointer 12 to move toward the right as viewed by the operator.

The camera is shown as provided with a well known type of direct view finder, built into the carrying handle 15, the eyepiece frame 16 with its lens or peepsight 17 being at the rear, and the object glass 18, having a carrier 19 that is pivoted at 20 to projections 21 on the housing 5, being in the front end of the handle.

In an opening 22 in the rear of the housing 5, and under the finder glass 18, is mounted an optical member 23, which may be a prism, for bringing the pointer 12 and its scale 14 into the field of vision of the operator through a slit 24 in the eye-piece frame 16. The scale 14 somewhat magnified, is visible by light that enters an opening 6ª simultaneously with the view in the finder, without requiring awkward effort by the operator.

In front of the scale plate 13 is another hand or pointer 25, pivoted at 26 approximately coaxially with indicator 12, but not in any way connected to the latter or to the other parts that are light-actuated. The manner of mounting the pointer 25 is not illustrated in detail, but its pivot 26 may be on a bracket at the bottom of housing 5, and a spring, (not shown) may be provided to bias the pointer 25 toward one side of the housing 5. An arm 27 below the pivot 26 constitutes an extension of pointer 25 and bears on a cam 28 integral with the diaphragm adjusting ring 29 on the lens mount 2ª, the ring 29 also carries a knurled lug 30 located at a point convenient to the operator. Movement of this lug 30 upwardly or downwardly to adjust the diaphragm D moves the pointer 25 across the scale 14 and opens or closes the diaphragm D in accordance with the f values corresponding to the position of the pointer on the scale.

In using a camera equipped as illustrated the operator sights through the direct view finder and when the desired view is framed therein, the light value of the scene or object will activate the cell 9 and the armature 10, so that the indicator 12 immediately moves to a position on the scale that corresponds to the correct diaphragm aperture for that particular light condition. The operator then may move the lug 30 by using the thumb or a finger of the same hand that holds the front of the camera, until the pointer 25 coincides with the indicator 12, the former being visible through the translucent scale glass 13 and the indicator 12 being directly visible between the operator and the scale through the prism 23.

Both pointers are readily viewed by the operator through slit 24 and eyepiece glass 17 simultaneously with the scene framed in the finder glass 18. The operator does not have to remove his eye from the finder, but may move the camera from one scene to another, following with the pointer 25 the changes of the indicator 12 by moving the lug 30 and thus constantly correcting the diaphragm opening to suit the existing conditions.

If a film of slower speed is to be used, a mask may be provided to slip over the front of housing 5, thus reducing the total amount of light that reaches the cell 9, and necessitating a larger diaphragm aperture for a given condition.

For long distance or telephoto work, the regular lens may be removed and a telescopic type substituted. A detachable fastening may be used, and such fastening is not illustrated in detail. Preferably it may be of the bayonet lock type, so that when the lens mount 2 is turned in its socket to the holding position, a catch such as a sliding bolt 31 movable laterally in an extension 32 of the lens mount, may engage a part on the camera body to prevent the lens mount from turning, and the latter will be readily removable when the bolt 31 is moved back.

Figure 4:
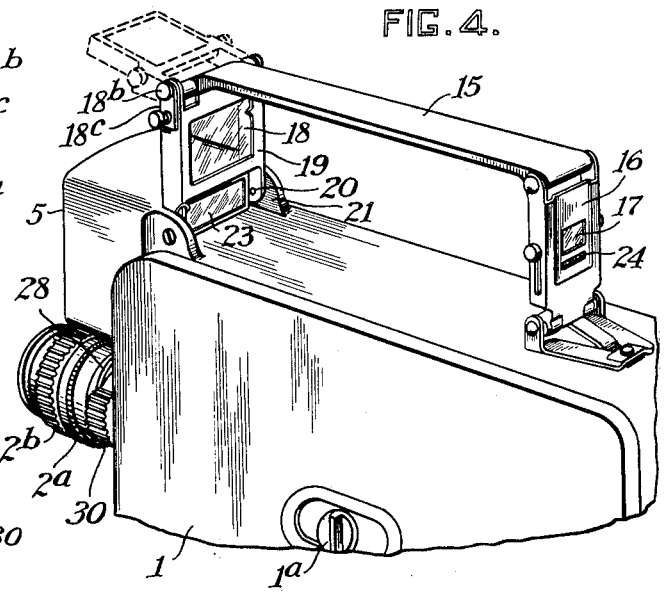
Fig. 4 is a perspective view looking toward the front of a camera.

In using a "telephoto" lens, the regular object glass 18 of the finder is not required, and it therefore is preferably arranged to be swung out of the line of vision. To this end a sub-frame 18ª in which the object glass 18 is mounted, is pivoted at 18ᵇ in the top of the carrier 19, and a friction catch 18ᶜ permits the glass 18 to be swung upwardly to the position indicated in broken lines in Fig. 4. The eyepiece lens 17 also is arranged to slide downwardly, knobs 33 guided in slots 34 being provided on either side of the eyepiece frame 16 for this purpose. Therefore for a "close-up" of a distant view the scene is observed through two sight openings without lenses.

It should be pointed out that when the eyepiece lens 17 is lowered for telephoto use, it remains in front of the slit 24 to continue performing its function of enabling the operator to focus on the pointers 12 and 25 and their scale 14.

Each telephoto objective as well as the normal objective used on the camera will be provided with a cam 28 having a configuration correlated to its focal length so that adjustment of its diaphragm until the two pointers 12 and 25 are superposed will result in the proper diaphragm setting. With a single fixed scale 14 the actual f. value of the diaphragm opening may be indicated for only one focal length objective but this is generally unimportant although other scales may be provided, if desired, for each objective to be used.

Although I have described my invention as embodied in a motion picture camera, it will be obvious to those skilled in this art that many modifications will suggest themselves without departing from the scope of the appended claims.

What I claim as new and desire to secure by Letters Patent of the United States, is:

1. In a motion picture camera, a casing, a virtual image view finder mounted on top of the casing, an objective mount removably mounted on the front of the casing, said mount having a diaphragm and a member for adjusting the diaphragm, a self contained housing built into the top-front part of the casing, a light sensitive cell and a meter member mounted in said housing, a movably mounted pointer extending into said housing and having a cam lever at its lower end, a cam carried by the diaphragm adjusting member of said objective mount for engaging the cam lever, whereby adjustment of the diaphragm moves said pointer a distance which is a function of the shape of said cam, the shape of said cam being so correlated to the focal length of the objective in said mount that adjustment of the diaphragm to bring said pointer to a position indicated by said meter member results in a proper setting of the diaphragm.

2. An objective mount adapted to be detachably secured to a camera having a photoelectric exposure meter and a pointer movable to a position indicated by the meter to insure correct exposure, said mount comprising an objective lens, a diaphragm, a member movable to adjust the diaphragm, a cam carried by the mount and movable with said movable member, said cam having a configuration corresponding to the focal length of the objective lens and so positioned on said mount that it comes into actuating engagement with said pointer when the objective mount is secured to the camera, whereby adjustment of the diaphragm will move said pointer in accordance with the focal length of the objective lens.

JOSEPH MIHALYI.